United States Patent
Grandhee et al.

(10) Patent No.: US 7,811,656 B2
(45) Date of Patent: Oct. 12, 2010

(54) PLASTIC GLAZING SYSTEM HAVING A PROMOTION OF INK ADHESION ON THE SURFACE THEREOF

(75) Inventors: Sunitha Grandhee, Novi, MI (US);
Keith D. Weiss, Fenton, MI (US);
Judith Na, Farmington Hills, MI (US)

(73) Assignee: Exatec, LLC, Wixom, MI (US)

( * ) Notice: Subject to any disclaimer, the term of this patent is extended or adjusted under 35 U.S.C. 154(b) by 1153 days.

(21) Appl. No.: 11/454,467

(22) Filed: Jun. 16, 2006

(65) Prior Publication Data
US 2007/0003742 A1 Jan. 4, 2007

Related U.S. Application Data

(60) Provisional application No. 60/691,908, filed on Jun. 17, 2005.

(51) Int. Cl.
*B41M 5/00* (2006.01)
*B44C 1/17* (2006.01)
*G03G 7/00* (2006.01)

(52) U.S. Cl. .................. 428/195.1; 428/208; 428/328; 428/423.1; 428/425.5; 428/425.6; 428/426; 428/428; 428/429; 428/430; 428/447; 428/450; 428/480; 428/913.3

(58) Field of Classification Search .............. 428/195.1, 428/208, 328, 423.1, 425.5, 425.6, 426, 428, 428/429, 430, 447, 450, 480, 913.3
See application file for complete search history.

(56) References Cited

U.S. PATENT DOCUMENTS

| | | | |
|---|---|---|---|
| 4,883,940 A | 11/1989 | Tokarz | |
| 5,432,258 A * | 7/1995 | Yoshimura | 428/32.79 |
| 2004/0191521 A1* | 9/2004 | Weiss et al. | 428/411.1 |
| 2005/0202263 A1* | 9/2005 | Sargent et al. | 428/500 |
| 2005/0252908 A1* | 11/2005 | Weiss | 219/522 |
| 2006/0196865 A1* | 9/2006 | Weiss | 219/203 |

FOREIGN PATENT DOCUMENTS

| WO | WO 03/092999 | 11/2003 |
|---|---|---|
| WO | WO 2004/092288 | 10/2004 |
| WO | WO 2006/017451 | 2/2006 |

OTHER PUBLICATIONS

International Search Report and Written Opinion of PCT/US2006/023626.

\* cited by examiner

*Primary Examiner*—Betelhem Shewareged
(74) *Attorney, Agent, or Firm*—Cantor Colburn LLP

(57) ABSTRACT

An automotive window panel including a substantially transparent substrate with a protective coating system disposed thereon, and an ink applied onto the protective coating system is disclosed. The formulation of the ink includes an adhesion promoter and is adaptable to adhere to the surface of the protective coating with the adhesion promoter.

20 Claims, 2 Drawing Sheets

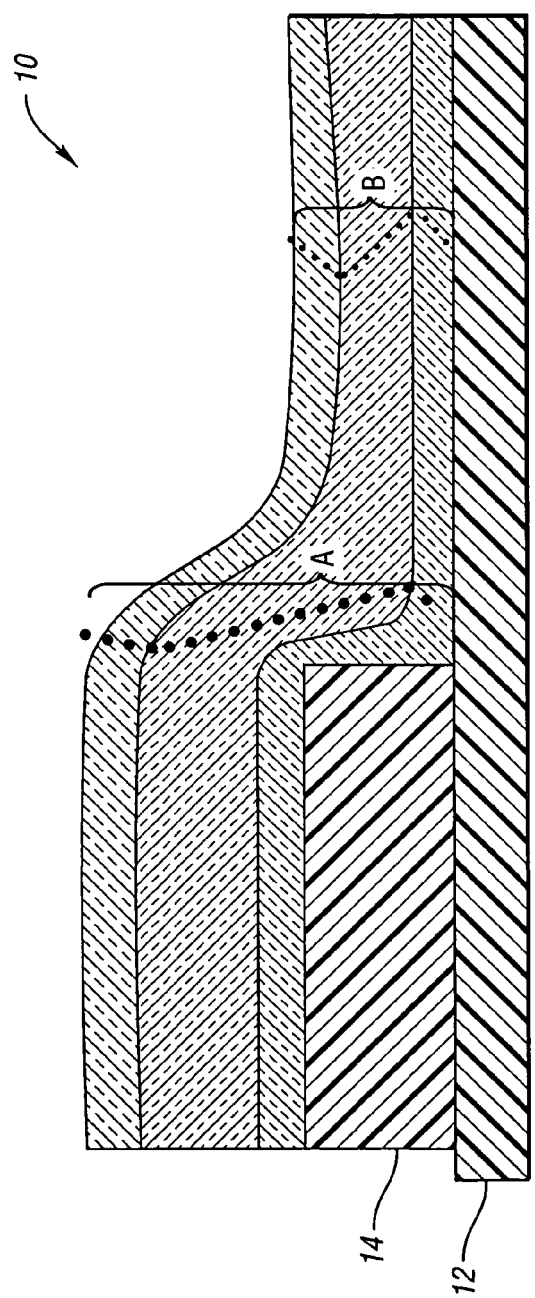
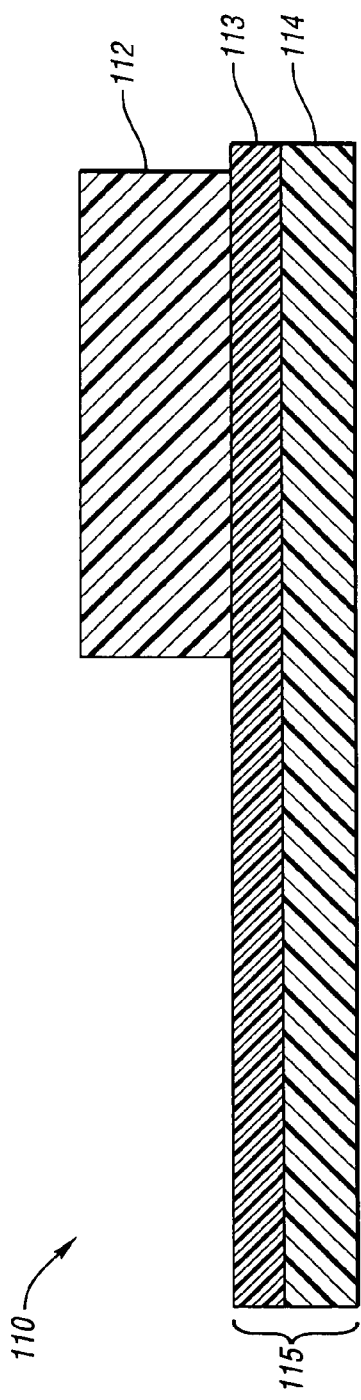

PLASTIC GLAZING SYSTEM HAVING A PROMOTION OF INK ADHESION ON THE SURFACE THEREOF

CROSS-REFERENCE TO RELATED APPLICATION

This application claims the benefit of U.S. Provisional Application No. 60/691,908, filed on Jun. 17, 2005, entitled "PROMOTION OF INK ADHESION TO THE SURFACE OF A PLASTIC GLAZING", the entire contents of which are incorporated herein by reference.

BACKGROUND OF THE INVENTION

The inks used to provide either decorative functionality (black-out, fade-out, logo, etc.) or conductive functionality (defroster, antenna, etc.) for plastic automotive windows are typically applied directly to the window surface and subsequently over-coated with protective (weathering, abrasion resistant) coatings. However, this may lead to the creation of optical distortion at the edges of the printed image. For example, along each of the grid lines that make up the defroster grid pattern, this optical distortion may affect the driver's field of vision.

As shown for part 10 of FIG. 1, a cause of this optical distortion is believed to be related to the difference in coating thickness that occurs across a substrate 12 of the part 10 and at the interface between a printed image 14 and the remaining surface of the part 10. As shown in FIG. 1, the thickness of the coating system (referenced as layers 1-3) near the image-part interface, $A_{thickness}$, can be substantially greater than the thickness of the coating over the rest of the part, $B_{thickness}$. The difference in the refractive index between the different coating layers causes light to be refracted differently in the two regions marked as light path A and light path B in FIG. 1. Thus, the human eye will detect an optical distortion near the printed image.

In view of the above drawbacks and other limitations of the prior art, it is seen that there exists a need for a printed plastic window panel that does not exhibit, or at least minimizes, optical distortion through the window.

BRIEF SUMMARY OF THE INVENTION

To overcome the deficiencies of the prior art, the present invention provides a construction that eliminates optical distortion by printing the image onto the surface of the coating system instead of directly onto the part. However, the surface properties of the coating are different than the surface properties of a plastic and, therefore, create problems with the adhesion of the applied ink to the surface of the coated part. In another aspect of the invention, a modification of the ink formulation is made in order to enhance the adhesion of the ink to the surface of the glazing system applied to the plastic substrate.

Further objects, features, and advantages of the present invention will become apparent from consideration of the following description and the appended claims when taken in connection with the accompanying drawings.

BRIEF DESCRIPTION OF THE DRAWINGS

FIG. 1 is a schematic view of a prior art panel depicting a difference in light paths between a plastic substrate (B) and the plastic substrate with a printed image (A) after the application of a protective coating system thereon;

FIG. 2 is a schematic view of a plastic glazing system in accordance with one embodiment of the present invention.

DETAILED DESCRIPTION OF THE INVENTION

Figure 3:
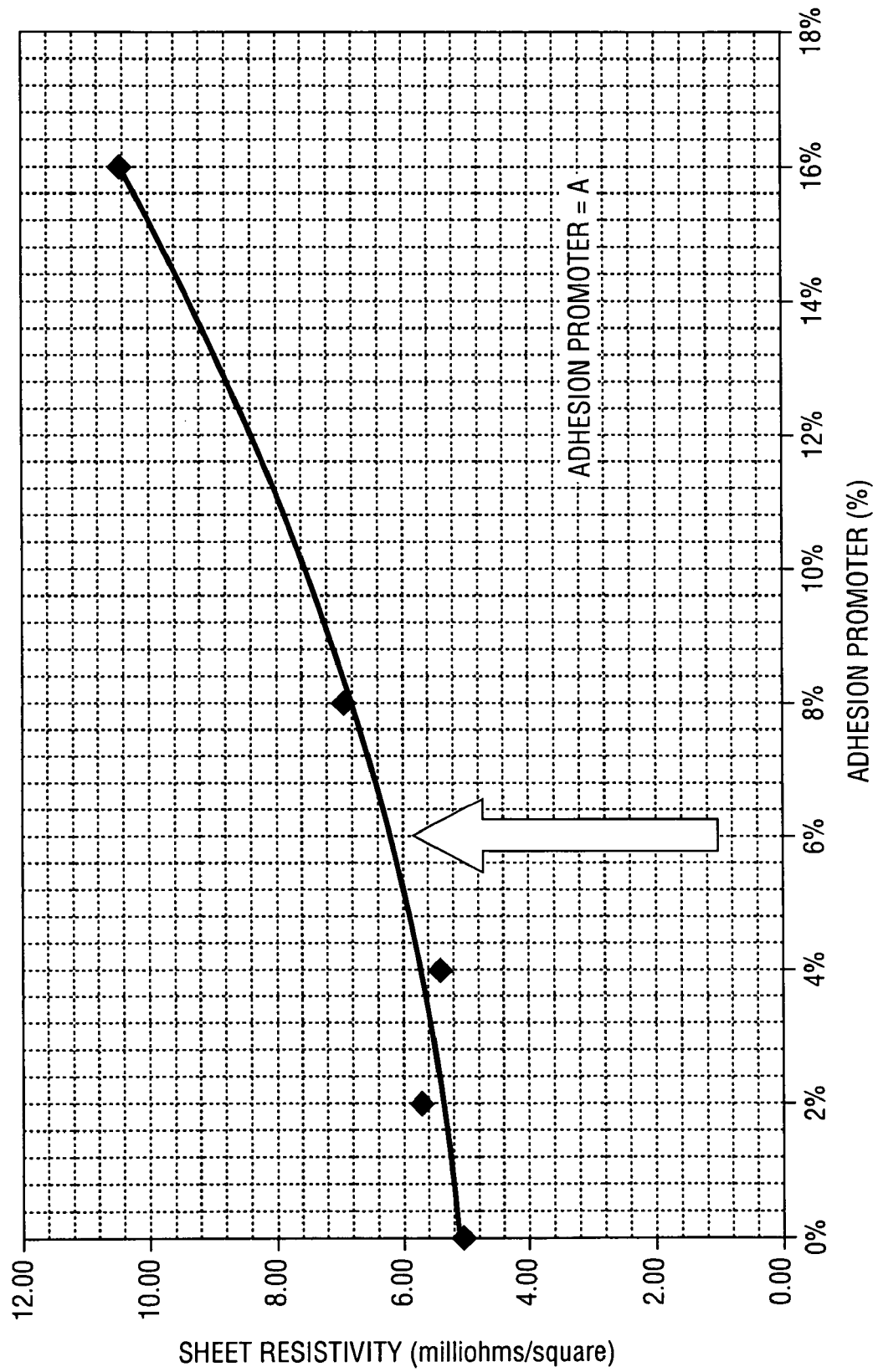
FIG. 3 is a graph of measured sheet resistivity (milliohms/square) versus the amount of adhesion promoter (A) added to a conductive ink prior to printing.

As further discussed below, it has been found that the addition of a family of adhesion promoters to either decorative or conductive ink formulations can provide adhesion enhancement, allowing deposition of such inks onto the surface of a plastic glazing system. In one embodiment, shown in FIG. 2, a panel 110 includes a transparent plastic substrate 114 over which a coating system 113 and a printed image 112 have been applied, in that order. An adhesion promoter is mixed with an ink that defines a printed ink image 112. The mixing of the adhesion promoter with the ink is performed prior to the application of the printed ink image 112 on the coating system 113 of the plastic substrate 114. The adhesion promoter acts as a coupling agent between the surface of a glazed substrate 115 and either polymeric resin in the ink or an organic surface treatment present on the pigment within the ink.

To act as a coupling agent between different interfacial surfaces, a first end of the adhesion promoter is capable of coupling with the molecular structure of the surface of the glazed substrate 115. The glazed substrate 115 has an abrasion resistant surface that is typically either a siloxane structure arising from a silicone hard-coat or a glass-like structure arising from the deposition of $Si_wO_xC_yH_z$ layer. Adhesion to this type of surface may be established through ionic, covalent, or hydrogen bonding mechanisms, as well as through van der Waal forces. A variety of silanes containing hydroxyl, methoxy, or ethoxy groups are known to effectively adhere to inorganic surfaces containing a relatively high degree of oxygen.

In addition to adhering to the coating 113 of the substrate 114, the adhesion promoter also performs a similar function with the solid structure of the ink. In this embodiment, the adhesion promoter includes a second end that is capable of adhering to either the pigments or polymeric resin present in the ink formulation. The main pigments in a conductive ink may be metallic in nature, such as silver, copper, or silver oxide. The pigments typically present in a decorative ink may be a form of a graphite or carbon black, as well as titanium dioxide. The polymeric resin present in both conductive and decorative ink formulations may be polycarbonate-based, polyester-based, acrylic-based, or polyurethane-based.

Fourteen adhesion promoters (A through N) were evaluated for use with a conductive ink as shown in Table 1 below. Each of the adhesion promoters was added to a conductive silver ink formulation, such as the ink obtained from Parelec Inc. (EXA-101, New Jersey). The addition of each of the adhesion promoters was done over a period of several minutes with the entire mixture being subjected to mixing in order to gain homogeneity. The amount of adhesion promoter that was added to the silver ink ranged from 3% weight (in screen tests) up to 16% weight (in some optimization tests). The ink was deposited onto the surface of the glazed substrate 115 using conventional screen printing technology and equipment. However, other techniques, such as multidimensional screen printing, membrane image transfer printing, robotic dispensing, and mask and spray, would be suitable deposition methods without falling beyond the scope and spirit of the present invention.

TABLE 1

| | ADHESION PROMOTER TYPE | COMPANY |
|---|---|---|
| A | Gamma-isocyanatopropyltriethoxysilane | General Electric |
| B | Gamma-isocyanatopropyltrimethoxysilane | General Electric |
| C | N-ethyl-3-trimethoxysilyl-2-methyl-propanamine | General Electric |
| D | N-beta-(aminoethyl)-gamma-aminopropyltrimethoxysilane | General Electric |
| E | 3-Aminopropyltriethoxysilane | Sigma-Aldrich |
| F | Triethoxysilylpropylenecarbamate | Gelest |
| G | Glycidoxypropyltrimethoxysilane | Sigma-Aldrich |
| H | Methyltrimethoxysilane | Gelest |
| I | Neopentyl(diallyl)oxytri(dodecyl)benzene-sulfonyl titanate | Kenrich Petrochemicals |
| J | Vinylbenzylethylenediaminepropyl-trimethoxysilane monohydrochloride | Dow Corning |
| K | Vinyltrimethoxysilane | Dow Corning |
| L | Octadecylaminodimethyl trimethoxysilyl-propyl ammonium chloride | Dow Corning |
| M | Cyanodecyltriethoxysilane | Gelest |
| N | Mercaptopropyltrimethoxysilane & Chloropropyltrimethoxysilane mixture | General Electric |
| O | Control (NO ADHESION PROMOTER) | N/A |

The glazed substrate 115 upon which the ink was deposited included a transparent polycarbonate substrate 114 with protective coatings 113 comprised of a silicone hard-coat (Exatec LLC, SHP-9X acrylic primer & SHX silicone hard-coat), both with and without a glass-like layer deposited by plasma enhanced chemical vapor deposition (PECVD). (The glass-like layer/PECVD system is commercially available from Exatec LLC as the Exatec® 900 glazing system.) After being printed onto the surface of the glazed substrate in a defroster grid pattern, the silver ink was cured according the manufacturer's preferred procedures at 129° C. for about 60 minutes.

Adhesion testing of the printed silver grid pattern was accomplished using a standard cross-hatch tape peel test (ASTM D3359-95), as is known in the art. Although, the actual pass and fail criteria for this test is usually agreed upon with the end customer, the percentage of the silver paste remaining after the tape pull would ideally be greater than 95%. For test purposes, it was assumed that greater than 80% adhesion would be acceptable (pass) with greater than about 95% adhesion being preferred. The results obtained for the initial adhesion retention of the silver ink containing 3% of the various adhesion promoters (A-N) is shown in Table 2.

TABLE 2

| | Initial Adhesion % 3% Adhesion Promoter | | |
|---|---|---|---|
| | SHX | PECVD | |
| A | 99 | 100 | PASS |
| B | 95 | 84 | PASS |
| C | 99 | 99 | PASS |
| D | 99 | 99 | PASS |
| E | 98 | 98 | PASS |
| F | 0 | 25 | Fail |
| G | 0 | 0 | Fail |
| H | 40 | 5 | Fail |
| I | 0 | 0 | Fail |
| J | 100 | 99 | PASS |
| K | 1 | 13 | Fail |
| L | 0 | 0 | Fail |
| M | 99 | 99 | PASS |
| N | 98 | 98 | PASS |
| O (Control) | 0 | 0 | Fail |

As shown in Table 2, ink formulations with eight of the adhesion promoters (A-E, J, & M-N) passed the test, while the remaining six adhesion promoters (F-I, K-L) failed. In comparison, the printed image that did not contain an adhesion promoter ink formulation "O" was found to entirely delaminate during this test with 0% adhesion and retention. All of the adhesion promoters that passed the test were found to pass the test both for adhesion to the siloxane surface of the SHX coating and for adhesion to the glass-like surface of the Exatec® 900 glazing system. Each of the adhesion promoters that passed the test, with the exception of ink formulation "B" was found to meet the preferred criteria of greater than about 95% retention. The generic families to which the adhesion promoters that passed the test include isocyanato-, cyano-, mercapto-, and amino-functionality. The length of the hydrocarbon chain in the adhesion promoter can vary and may provide some advantages with respect to overcoming steric hinderance towards attaching both ends of the coupling agent to their targeted functionality. The isocyanato- and cyano-containing adhesion promoters have been found by the inventors to exhibit more robust adhesive properties than the mercapto- and amino-containing adhesion promoters and thus are preferred.

The robustness of the adhesive properties exhibited by the various adhesion promoters were evaluated by submerging the printed substrates in 65° C. water for a period of multiple days. The adhesion of the printed image 112 to the surface of the glazed substrate 115 was examined using the previously described adhesion test after 1 day in the hot water bath and after 4 days in the hot water bath. An example of the test data obtained for the addition of 6% weight of adhesion promoter (A) in the silver ink is shown in Table 3. All of the printed silver images represented by four test results in four separate trials were found to pass the adhesion cross-hatch, tape pull test even after four days of submersion in hot water. Thus the improvement in adhesion observed upon the use of this adhesion promoter (A) is substantial over the loss of adhesion at day zero (initial adhesion) observed in Table 2 for a printed image that did not contain any adhesion promoter (O).

TABLE 3

| | Adhesion Retention (%) | | |
|---|---|---|---|
| 6% A | Day 0 | Day 1 | Day 4 |
| Trial 1 | 90 | 90 | 90 |
| | 96 | 92 | 92 |
| | 98 | 95 | 94 |
| | 99 | 98 | 98 |
| avg. | 96 | 94 | 94 |
| Trial 2 | 98 | 90 | 75 |
| | 95 | 95 | 88 |
| | 96 | 96 | 93 |
| | 94 | 94 | 91 |
| avg. | 96 | 94 | 87 |
| Trial 3 | 97 | 96 | 92 |
| | 98 | 97 | 93 |
| | 99 | 97 | 97 |
| | 99 | 98 | 96 |
| avg. | 98 | 97 | 95 |
| Trial 4 | 97 | 92 | 92 |
| | 97 | 98 | 97 |
| | 96 | 90 | 97 |
| | 99 | 97 | 94 |
| avg. | 97 | 94 | 95 |

The inventors have further discovered that the amount of adhesion promoter added to a conductive ink formulation will not affect the level of sheet resistivity exhibited by the printed ink, provided it is maintained at less than about 6% weight in the ink formation. The addition of more than about 6% weight of the adhesion promoter into the ink formulation will cause an increase in the sheet resistivity exhibited by the printed ink. This increase in sheet resistivity correlates with a decrease in conductivity and is therefore undesirable if the printed image is to function as either a defroster grid or an antenna. The adhesion data along with the corresponding sheet resistivity data measured for printed images containing various levels of adhesion promoter (A) is provided in Table 4.

TABLE 4

|  | Adhesion Promoter (A) | | |
| --- | --- | --- | --- |
|  | Ink Printed on | % A Added | Sheet Resistivity mΩ/sq. |
| TRIAL #5 | PECVD | 2% | 6.60 |
|  | PECVD | 4% | 5.90 |
|  | PECVD | 8% | 6.80 |
| TRIAL #6 | PECVD | 2% | 5.70 |
|  | PECVD | 4% | 5.40 |
|  | PECVD | 8% | 6.90 |
| O | PECVD | 16% | 10.40 |
|  | Siloxane | 8% | 5.60 |
|  | Control | 0% | 5.00 |

The standard sheet resistivity value obtained for the silver ink without an adhesion promoter applied directly to polycarbonate is on the order of 5 milliohms/square, as indicated by ink (0) in Table 4. Trial #5 and Trial #6 were both found to provide similar results. The sheet resisitivity of the silver ink with adhesion promoter (A) applied to a glazed substrated (PECVD) was observed to remain about 5 to 6 milliohms/square until the percentage of adhesion promoter present in the ink was increased to about 8%. FIG. 3 provides a graphical depiction of the sheet resistivity versus percentage of adhesion promoter (A). As shown in FIG. 3, about a six (6) percent level is the most adhesion promoter that can be used without causing the sheet resisitivity of the printed image to begin to significantly increase.

In another embodiment, different quantities of adhesion promoter (A) were added to a decorative ink with a composition of about 5 to 34 weight percent of a polyester resin obtained from a polyester ink (8452, Nazdar, Kansas) and about 1 to 13 weight percent polycarbonate resin obtained from a polycarbonate ink (HTR-952, Proell, Germany) with a weight ratio of less than 100:1 and greater than about 50:50 as shown in Table 5B. The decorative ink further included about 0.1 to 5 weight percent of an aromatic isocyanate catalyst with the balance being a solvent mixture (retarder).

TABLE 5B

|  | Trial 3 | Trial 4 | Trial 5 | Trial 6 |
| --- | --- | --- | --- | --- |
| Decorative Ink | 84.1 | 79.6 | 71.9 | 65.5 |
| Retarder | 6.6 | 6.3 | 5.7 | 5.2 |
| Catalyst | 3.6 | 3.4 | 3.1 | 2.8 |
| Adhesion Promoter (A) | 5.7 | 10.7 | 19.4 | 26.5 |
| TOTAL | 100 | 100 | 100 | 100 |

The procedure used to prepare the formulation for each trial shown in Table 5B can be described as follows: (1) The ink was weighed out into a container to which the retarder and adhesion promoter (A) was mixed and stirred for 10 minutes, followed by the addition of the catalyst. (2) The ink mixture was stirred well for an additional 15 minutes before application to the glazed substrate via screen printing. Care was taken to prevent the creation of a large or numerous quantity bubbles, of which would lead to the formation of foam. The level of adhesion promoter added was about 5 to 25% based on the total weight of the formula. The thickness of each cured ink layer in the various trials is provided in Table 6.

TABLE 6

|  | Ink Thickness (microns) |
| --- | --- |
| Control | 14.57 |
| Trial 3 | 12.28 |
| Trial 4 | 15.12 |
| Trial 5 | 9.47 |
| Trial 6 | 3.35 |

Results of the cross-hatch adhesion test performed on the glazed substrate (Exatec® 900 System) printed with the decorative ink after 10 days in water at 65° C. is presented in Table 7. For decorative inks, the addition of the adhesion promoter allows the printed image to survive exposure to water immersion testing for greater than 3 days as shown by Trials 7-9. In comparison, the printed image containing no adhesion promoter (control) and the image containing greater than about 25% adhesion promoter (Trial 10) were found to fail adhesion testing after Day 3 of water immersion.

The decorative inks of the present invention can be acrylic resin inks, acrylic/nitrocellulose resin inks, nitrocellulose/polyamide resin inks, vinyl/acrylic resin inks, alkyd resin inks, vinyl/polyester resin inks, vinyl resin inks, polycarbonate resin inks, polyester resin inks or inks containing another organic resin, as well as mixtures, copolymers, or blends of the resins thereof. An ink with a polyester, polycarbonate, or acrylic resin or mixture, blend, or copolymer thereof is preferred. The ink may be classified as single component or two component in nature.

TABLE 7

|  | Crosshatch Location | Day 0 | Day 1 | Day 1 New | Day 3 | Day 7 | Day 10 |
| --- | --- | --- | --- | --- | --- | --- | --- |
| Control - no additive | Center | Pass | Pass | Pass | Pass | Fail | Fail |
|  | Edge | Pass | Pass | Pass | Pass | Fail | Fail |
| Trial 7 | Center | Pass | Pass | Pass | Pass | Pass | Pass |
|  | Edge | Pass | Pass | Pass | Pass | Pass | Pass |
| Trial 8 | Center | Pass | Pass | Pass | Pass | Pass | Pass |
|  | Edge | Pass | Pass | Pass | Pass | Pass | Pass |
| Trial 9 | Center | Pass | Pass | Pass | Pass | Pass | Pass |
|  | Edge | Pass | Pass | Pass | Pass | Pass | Pass |

TABLE 7-continued

|  | Crosshatch Location | Day 0 | Day 1 | Day 1 New | Day 3 | Day 7 | Day 10 |
|---|---|---|---|---|---|---|---|
| Trial 10 | Center | Pass | Pass | Pass | Pass | Fail | Fail |
|  | Edge | Pass | Pass | Pass | Pass | Fail | Fail |

The colorant pigment in the decorative ink is preferably carbon black although other inorganic and organic colored pigments may be utilized. Such colorant pigment may include, but not be limited to carbon black, copper phtahocyanine blue, dioxazine violet, quinacridone magenta, azo diarylide yellow, rutile titanium dioxide (white), perylene red, molybdate orange, yellow iron oxide, chromium green oxide, or cadmium orange. Special effect pigments, such as pearlescent pigments and metallic flakes may be incorporated into the formulation.

The isocyanate catalyst, if used, is preferably an aromatic polyisocyanate, such as the NB-70 catalyst (Nazdar Inc., Kansas). This particular isocyanate is dispersed in propylene glycol methyl ether acetate (40%, also called PM acetate), although other solvents could be utilized. The isocyanate can also be other aromatic or aliphatic diisocyanates, such as polymeric hexamethylene diisocyanate (HMDI), isophorone diisocyanate (IPDI), 2,6-tolylene diisocyanate (TDI), diphenylmethane diisocyanate (MDI), or xylene diisocyanate (XDI), among others.

An optional dispersant may be used to insure the pigments are adequately dispersed. This optional dispersant may be an ionic or nonionic dispersing agent. Such surfactants include, but are not limited, to metallic soaps, sulfonates, phosphate esters, fatty acid esters, fluoroaliphatic polymeric esters, titanate or ziconate or aluminate coupling agents, organo-modified polysiloxanes, block copolymers of poly(alkylene oxide), and commercial proprietary surfactants, such as Hypermer® and Solsperse® hyperdispersants (ICI Americas, Inc.). The optional surfactant is preferably an organo-modified polysiloxane, also called a polyether siloxane copolymer, such as Tego® Wet KL 245 (Goldshmidt Chemical Corp., Virginia).

An optional opacity enhancing filler may be utilized in the decorative ink in order to insure the opacity of the printed image. These optional fillers may be inorganic in nature, such as alumina, silica, titanium dioxide, magnesium silicate (talc), barium sulfate, calcium carbonate, aluminum silicate (clay), calcium silicate (wollastonite), aluminum potassium silicate (mica), metallic flakes, etc., or organic in nature, such as furnace black, channel black, and lamp black among others. Highly refractive fillers, such as titanium dioxide, are preferred for increasing opacity due to their small mean particle size of less than 1.0 micrometers. For example, titanium dioxide having a mean particle size of 0.36 micrometers is available as Ti-Pure® R-706 (DuPont Titanium Technologies, Delaware).

The conductive ink may be comprised of conductive particles, flakes, powders, or mixtures and blends thereof dispersed in a polymeric matrix. The polymeric matrix is preferably an epoxy resin, a polyester resin, a polyvinyl acetate resin, a polyvinylchloride resin, a polyurethane resin or mixtures and copolymers of the like. The conductive particles, flakes, or powders present in the ink, paste, or paint may be comprised of a metal including, but not limited to, silver, copper, zinc, aluminum, magnesium, nickel, tin, or mixtures and alloys of the same, as well as any metallic compound, such as a metallic dichalcogenide. These conductive particles, flakes, or powders may also be any conductive organic material known to those skilled in the art, such as polyaniline, amorphous carbon, and carbon-graphite.

Any solvents, which act as the carrier medium in the conductive inks, pastes, or paints, may be a mixture of any organic vehicle that provides solubility for the organic resin. Examples of metallic inks, pastes, or paints include silver-filled compositions commercially available from DuPont Electronic Materials, Research Triangle Park, N.C. (5000 Membrane Switch, 5029 Conductor Composition, 5021 Silver Conductor, and 5096 Silver Conductor), Acheson Colloids, Port Huron, Mich. (PF-007 and Electrodag SP-405), Methode Engineering, Chicago, Ill. (31-1A Silver Composition, 31-3A Silver Composition), Creative Materials Inc., Tyngsboro, Mass. (118-029 2 k Silver), and Advanced Conductive Materials, Atascadero, Calif. (PTF-12).

The substrate 114 upon which the coating 113 and printed image 112 are integrally formed may be any transparent panel comprised of a thermoplastic polymeric resin. The thermoplastic resins of the present invention include, but are not limited to, polycarbonate resins, acrylic resins, polyarylate resins, polyester resins, and polysulfone resins, as well as copolymers and mixtures thereof. Transparent panels may be formed into the shape of a window through the use of any technique known to those skilled in the art, such as molding, thermoforming, or extrusion.

The protective coatings 113 applied to the substrate 114, and upon which the conductive or decorative ink 112 is printed, include, but are not limited to, a silicone hard-coat, a polyurethane coating, an acrylic coating, and a "glass-like" coating among others. Layered coating systems comprised of either an acrylic primer & silicone interlayer or a polyurethane interlayer over-coated with a "glass-like" or glass film topcoat may also be used. Examples of protective coatings include a combination of an acrylic primer (SHP401, GE Silicones, Waterford, N.Y.) and a silicone hard-coat (AS4000, GE Silicones), as well as a $SiO_xC_yH_z$ "glass-like" film deposited by Plasma Enhanced Chemical Vapor Deposition (PECVD). Examples of a layered coating system are the acrylic/silicone/"glass-like" coating systems offered by Exatec LLC (Wixom, Mich.) as Exatec® 500 & Exatec® 900 for plastic glazing. The protective coatings 113 may be applied by dip coating, flow coating, spray coating, plasma enhanced chemical vapor deposition (PECVD) or other techniques known to those skilled in the art.

While the present invention has been described in terms of preferred embodiments, it will be understood, of course, that the invention is not limited thereto since modifications may be made to those skilled in the art, particularly in light of the foregoing teachings.

The invention claimed is:

1. An automotive window panel, the window panel comprising:
    a substantially transparent plastic substrate;
    a protective coating system disposed on a surface of the substrate; and
    an ink applied onto the protective coating system, the ink including an adhesion promoter, the ink being adapted to adhere to the surface of the protective coating with the adhesion promoter and to not adhere to the surface of the protective coating without the adhesion promoter.

2. The window panel of claim 1 wherein the adhesion promoter is a molecule having first and second ends, each end having a silane coupling agent comprising reactive functional groups.

3. The window panel of claim 2 wherein the reactive functional groups of the coupling agent are comprised of one of hydroxyl and alkoxy functional groups at one of the ends of the molecule and one of mercapto-, isocyanato-, cyano-, and amino-functional groups at the other end of the molecule.

4. The window panel of claim 1 wherein the ink is at least one of a conductive ink and a decorative ink.

5. The window panel of claim 1 wherein the ink is a conductive ink comprised of a polymeric matrix having one of conductive particles, flakes, powders, or mixtures thereof.

6. The window panel of claim 5 wherein the polymeric matrix is one of an epoxy resin, a polyester resin, a polyvinyl acetate resin, a polyvinylchloride resin, a polyurethane resin or a mixture thereof.

7. The window panel of claim 5 wherein the conductive ink comprises at least one of the following components: silver, copper, zinc, aluminum, magnesium, nickel, tin, a metallic dichalcogenide, polyaniline, amorphous carbon, and carbon-graphite.

8. The window panel of claim 1 wherein the ink is a decorative ink comprising one of an acrylic resin ink, acrylic/nitrocellulose resin ink, nitrocellulose/polyamide resin ink, vinyl/acrylic resin ink, alkyd resin ink, vinyl/polyester resin ink, vinyl resin ink, polycarbonate resin ink, polyester resin ink or a mixture thereof.

9. The window panel of claim 1 wherein the ink is a decorative ink comprising a polyester resin, polycarbonate resin, acrylic resin, or a mixture thereof.

10. The window panel of claim 1 wherein the protective coating system comprises one of a silicone hard-coat, a polyurethane coating, an acrylic coating, a polyurethane-acrylate copolymer, a glass film coating or mixture thereof.

11. The window panel of claim 1 wherein the protective coating system comprises an acrylic/silicone/glass-film coating system.

12. The window panel of claim 1 wherein the protective coating system includes an acrylic primer, a silicone hard-coat, and a $SiO_xC_yH_z$ glass film deposited by Plasma Enhanced Chemical Vapor Deposition (PECVD).

13. The window panel of claim 3 wherein the reactive functional groups comprised one of isocyanato- and cyano-functional groups at the other end of the molecule.

14. The window panel of claim 11 wherein the adhesion promoter was present in the ink in an amount of less than about 6% by weight, based upon a total weight of the ink.

15. The window panel of claim 1 wherein the adhesion promoter was present in the ink in an amount of less than about 5 to 25% by weight, based upon a total weight of the ink.

16. An automotive window panel, the window panel comprising:
   a substantially transparent plastic substrate;
   a protective coating system disposed on a surface of the substrate; and
   an ink applied onto the protective coating system, the ink including an adhesion promoter, the ink being adapted to adhere to the surface of the protective coating with the adhesion promoter and to not adhere to the surface of the protective coating without the adhesion promoter;
   wherein the adhesion promoter is a molecule having a functional group selected from the group consisting of mercapto-, isocyanato-, cyano-, and amino-functional groups.

17. The window panel of claim 16 wherein the functional group is selected from the group consisting of isocyanato- and cyano-functional groups.

18. The window panel of claim 16 wherein the adhesion promoter was present in the ink in an amount of less than about 6% by weight, based upon a total weight of the ink.

19. The window panel of claim 16 wherein the adhesion promoter was present in the ink in an amount of less than about 5 to 25% by weight, based upon a total weight of the ink.

20. An automotive window panel, the window panel comprising:
   a substantially transparent plastic substrate;
   an ink including an adhesion promoter,
   a protective coating system disposed between and adhering the ink to the substrate; and
   wherein the ink would not adhere to the protective coating without the adhesion promoter.

* * * * *